Feb. 3, 1970 E. R. HODIL, JR 3,493,163

REPEATING POWER ACTUATED TOOL

Filed Sept. 5, 1967 3 Sheets-Sheet 1

INVENTOR.
ELMER R. HODIL JR

BY H. Samuel Kieser
ATTORNEY

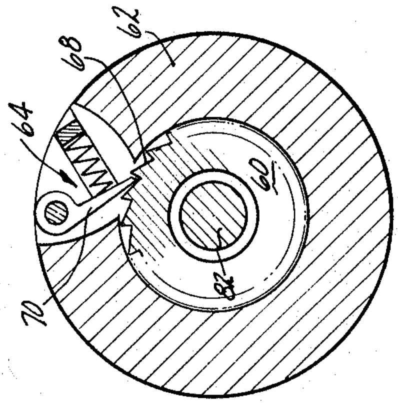
FIG-8
FIG-11
FIG-12
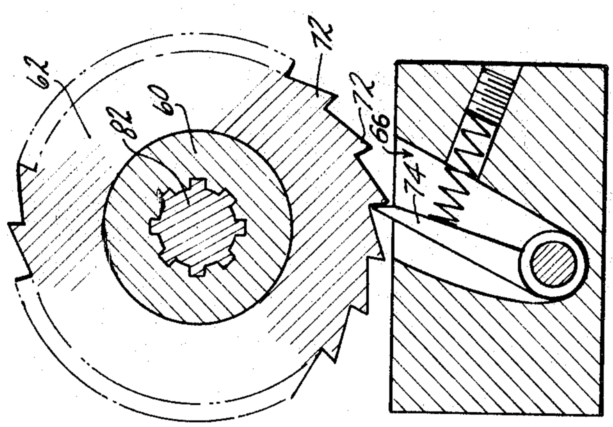
FIG-7
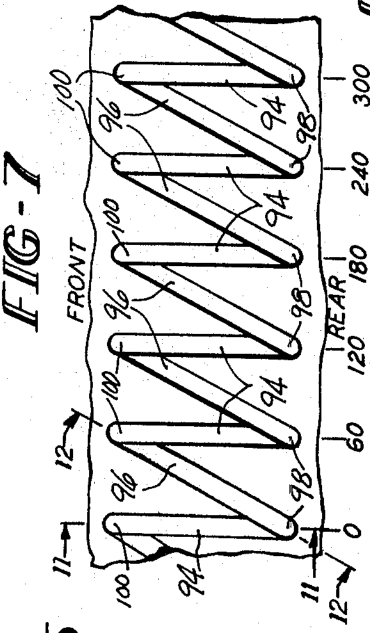
FIG-10
FIG-5
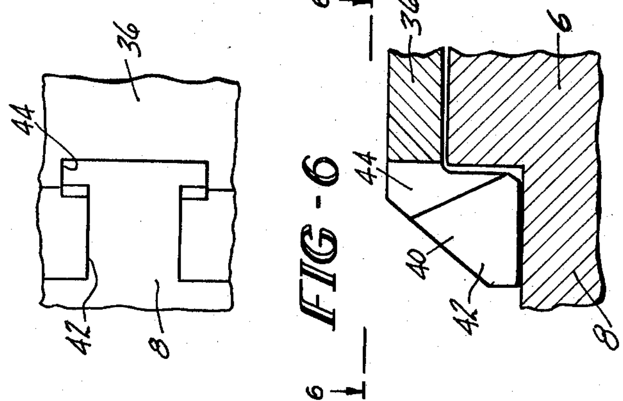
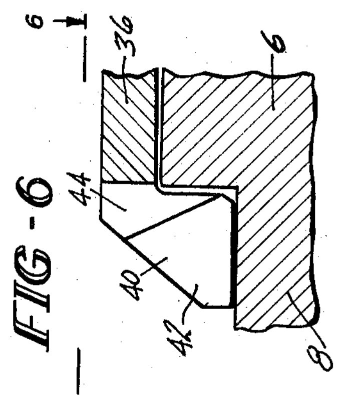
FIG-6
INVENTOR:
ELMER R. HODIL, JR.
BY
H. Samuel Kieser
ATTORNEY

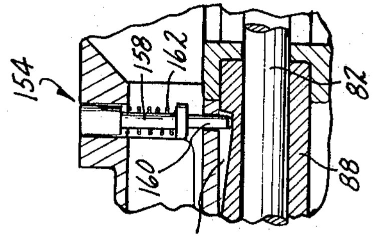
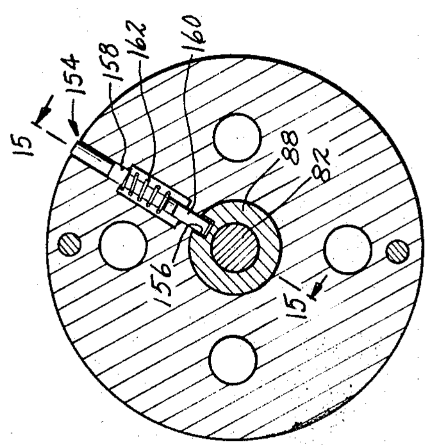
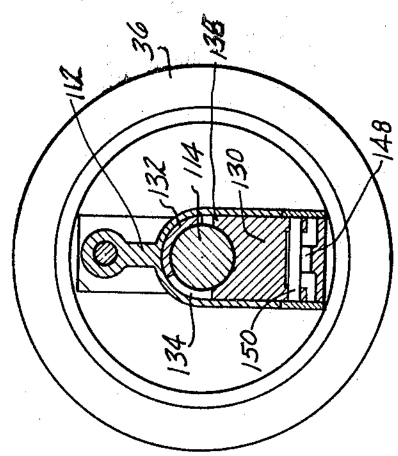
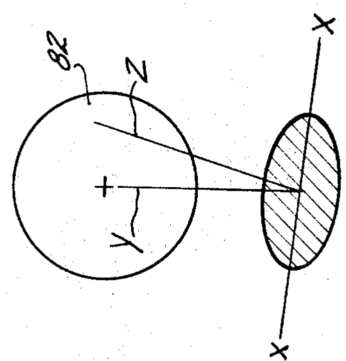
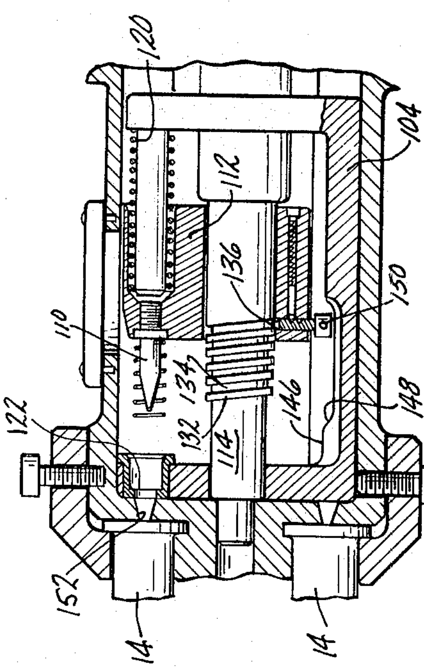
INVENTOR.
ELMER R. HODIL, JR.
BY H. Samuel Kieser
ATTORNEY

United States Patent Office 3,493,163
Patented Feb. 3, 1970

3,493,163

REPEATING POWER ACTUATED TOOL

Elmer R. Hodil, Jr., New Haven, Conn., assignor to Olin Mathieson Chemical Corporation, a corporation of Virginia Filed Sept. 5, 1967, Ser. No. 665,614
Int. Cl. B25c *1/08*
U.S. Cl. 227—9 15 Claims

ABSTRACT OF THE DISCLOSURE

A power-actuated fastening tool including a plurality of barrels circumferentially spaced apart and extending forwardly from a housing. Firing means are mounted for rotational movement about an axis for alignment with one of said barrels. The tool includes indexing means responsive to the rotation of an input shaft in one direction to rotate the firing means into alignment with the next adjacent barrel and means responsive to the rotation of the input shaft in the other direction to cock and fire said firing means.

This invention relates generally to power-actuated tools. More particularly, this invention relates to power-actuated tools of the type for driving fasteners and the like into steel and concrete and other types of surfaces.

A tool constructed in accordance with the present invention is especially adapted for connection to the manipulator arm of an underwater vessel for performing operations under water. Vessels of the type provided with such manipulator arms include the small one and two-man submarines currently being designed and used in various projects conducted at great depth under the sea. It is to be understood that this invention also has applicability to land based craft, and even craft to be used in environments which are unfavorable to humans and therefore, situations where they must stay within an enclosure supplied with the proper environment.

As the tool of the present invention is especially adapted to be connected to a manipulator arm, it is obvious that for such a tool to be economical the tool must be capable of more than one operation before reloading. It is, therefore, an object of the present invention to provide a power-actuated tool capable of performing a predetermined number of fastening operations before reloading.

Further, since the manipulator arms to which this tool is especially adapted to be connected are located outside of the submerged vessel, it is an object of the present invention to provide a tool which will function properly underwater and be unaffected by the high pressures.

It is a further object of the present invention to provide a tool which can be controlled by a suitable device spaced a distance from the tool itself.

The above objects and advantages of the present invention will become more apparent by referring to the following description of a preferred embodiment and to the accompanying drawings in which:

FIGURE 5 is a transverse sectional view taken along the lines 5—5 of FIGURE 4;

FIGURE 6 is a plan view taken in the direction of lines 6—6 of FIGURE 5;

FIGURE 7 is a transverse sectional view taken along the lines 7—7 of FIGURE 1;

FIGURE 8 is a transverse sectional view taken along the lines 8—8 of FIGURE 1;

FIGURE 9 is a sectional view taken along the lines 9—9 of FIGURE 1;

FIGURE 10 is a layout showing the configuration of the cam groove in the indexing sleeve;

FIGURE 11 is a sectional view taken along the lines 11—11 of FIGURE 10 showing the taper of the base of the axial portions of the cam groove;

FIGURE 12 is a sectional view taken along the lines 2—12 of FIGURE 10 showing the taper of the base of the transverse portions of the cam groove;

FIGURE 13 is a transverse sectional view taken along the lines 13—13 of FIGURE 1;

FIGURE 14 is a transverse sectional view taken along the lines 14—14 of FIGURE 1;

FIGURE 15 is a partial sectional view taken along the lines 15—15 of FIGURE 14; and FIGURE 16 is a vertical sectional view of the firing mechanism of the tool similar to FIGURE 1 but showing the firing mechanism in the cocked and ready-to-fire position.

Figure 1:
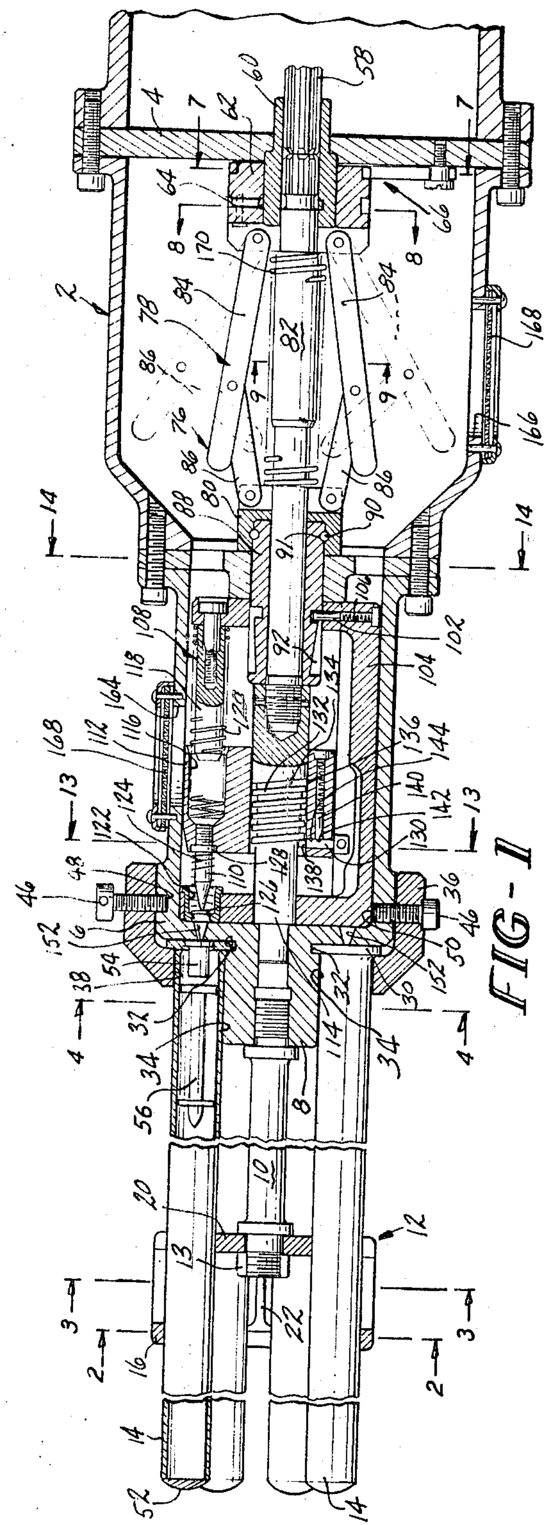
FIGURE 1 is a vertical sectional view of a tool constructed in accordance with the present invention.
Figure 4:
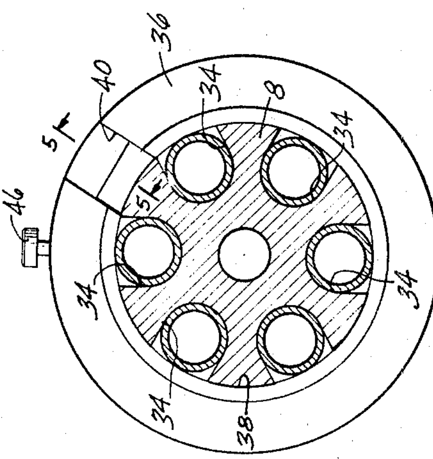
FIGURE 4 is a sectional view taken along the lines 4—4 of FIGURE 1.
Figure 3:
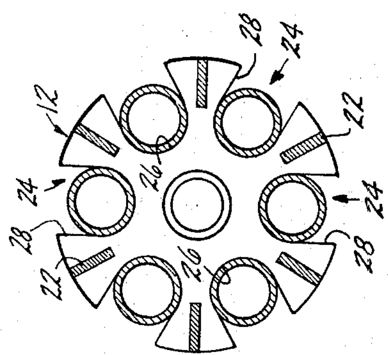
FIGURE 3 is a transverse sectional view taken along the lines 3—3 of FIGURE 1.
Figure 2:
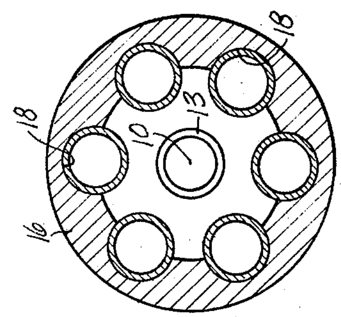
FIGURE 2 is a transverse sectional view taken along the lines 2—2 of FIGURE 1.

Referring to the drawings, and particularly FIGURE 1, a preferred embodiment of the present invention may include a housing 2 having a rear closure 4 and a forward breech closure 6, having a forward tubular extension 8. An elongated rod member 10 is threadedly connected to the forward tubular extension 8 and extends forwardly of the tool to mount a barrel supporting member 12 in any conventional manner such as by a nut 13.

As the preferred embodiment of the tool has been designed to accommodate six replaceable barrels 14, the barrel supporting member 12 comprises a forward ring member 16 having six semi-circular cutouts 18 in its internal edge portion which are circumferentially spaced equally about the forward ring member 16. The barrel supporting member 12 further includes a rearward disc member 20 spaced from and connected to the forward ring member 16 by six circumferentially-spaced web members 22. The rearward disc member 20 includes six cutouts 24 in its outer edge, each one being axially aligned with one of the cutouts 18 in the forward ring member 16. Each cutout 24 in the disc member 20 includes a semi-circular bottom portion 26 having a diameter equal to the outer diameter of the barrel and edge portions 28 tangential to the bottom portions 26.

The rearward ends of each of the replaceable barrels 14 includes a flange 30 which is adapted to be received in its respective semi-circular cutout 32 in the forward tubular extension 8 of the housing 2. The tubular extension 8 is also provided with smaller semi-circular cutouts 34 positioned forwardly of the cutouts 32 to receive the body of the barrel 14.

A barrel retaining ring 36 extends about the forward portion of the housing 2 and includes a forward internal surface 38 having a diameter equal to the diameter of an imaginary circle which is tangential to the outermost edges of the body of the barrel members 14. The barrel retaining ring 36 includes a radially extending slot 40 in its forward portion thereof which includes a first portion 42 having a width equal to the diameter of the body of a barrel 14, and a second rearward portion 44 having a width equal to the diameter of the flange of a barrel 14. The rearward portion 44 of slot 40 has its forward surface tapering inwardly toward the rear of the tool so that this portion of the slot is wider (in a direction parallel to the axis of the tool) at the outside surface of the retaining ring 36 than at the inside surface as shown in FIGURES 5 and 6.

The barrel retaining ring 36 is secured to the housing 2 by means of two or more threaded screw members 46 which normally extend into a circumferentially extending groove 48 in the housing 2. At one point in the groove, a bore 50 extends inwardly from the base thereof to provide an indexing mechanism for replacing the barrels 14.

To replace the barrels 14, the slot 40 in the barrel retaining ring 36 is aligned with one of the cutouts 34 in the forward tubular extension portion 8 of the housing 2 whereby the rearward end of a used barrel can be lifted upwardly and removed. The particular configuration of the barrel supporting member 12 permits the barrel to be tipped in such a manner. Since the ring member 16 engages only the top half of the barrels 14 while the rearward supporting disc member 20 engages only the bottom half of the barrels 14, the rearward end of a barrel may be pivoted outward about the disc member 20 and a new barrel inserted. The tapering on the inside surface of the second portion 44 of slot 40 permits the flanged end of the barrel to be rotated outwardly. This operation can be repeated until the six barrels are replaced. Then the retaining ring 36 can be further rotated until one of the screw members 46 is adjacent the bore 50 in the circumferential groove 48, whereupon the screw members 46 may be tightened so that the barrel members 14 are securely held in place. The tip of the screw adjacent the bore 50 enters the bore 50 to prevent rotation of the retaining ring 36.

Each barrel member 14 includes a sealed forward end 52, an explosive cartridge 54 sealed in its rearward end, and a fastener 56 positioned immediately forward of the cartridge. The cartridge 54 includes the usual primer to initiate the explosion.

The particular tool herein described is adapted to be driven by a rotatable shaft and for this purpose a male input splined shaft 58 mates with an internally splined inner drive member 60. The inner drive member 60 is connected to an outer drive hub 62 by a ratchet mechanism 64. The outer drive hub 62 cooperates with a ratchet mechanism 66 as can be seen in FIGURE 7. The ratchet mechanism 66 is attached to the rearward closure 4 as shown in FIGURE 1. As shown in FIGURE 8 the ratchet mechanism 64 between the inner drive hub 60 and outer drive hub 62 comprises a series of ratchet teeth 68 on the outer surface of the inner drive hub 60 and a spring biased pawl member 70 mounted in the outer drive hub 62. Further, as shown in FIGURE 7, the outer surface of the outer drive hub 62 is also provided with ratchet teeth 72 to cooperate with a spring biased pawl member 74 of ratchet mechanism 66. It is to be noted that the ratchet mechanism 64 between the inner and outer drive hubs 60 and 62 is of opposite configuration from the ratchet mechanism 66 between the housing 2 and outer drive hub 62.

Accordingly, by virtue of the particular ratchet mechanisms 64 and 66, when the male input spline shaft 58 is rotated in a counterclockwise direction as viewed in FIGURE 8 to rotate the inner drive member 60, the ratchet mechanism 64 will engage whereby the inner drive member 60 will drive the outer drive hub 62. However, when the male input spline shaft 58 is rotated in the opposite direction, i.e. clockwise as viewed in FIGURES 7 and 8, the pawl member 70 mounted in the outer drive hub 62 will slip over the teeth 68 in the outer surface of the inner drive hub 60 whereby no driving force will be transmitted to the outer drive hub 62. Moreover, the pawl member 74 mounted on the rearward closure will engage the teeth 72 of the outer drive hub 62 and positively prevent any rotational movement thereof. In other words, the ratchet mechanisms 64 and 66 act as a one-way clutch, whereby rotation of the input shaft 58 in one direction imparts rotation to the outer drive hub 62 through the inner drive member 60, although rotation of the input shaft 58 in the opposite direction has no effect upon the outer drive hub 62 which is prevented from rotating.

An indexing mechanism 76 comprises a flyball type linkage 78 interconnected between the outer drive hub 62 and a rotatable and longitudinally slidable sleeve 80 mounted on an axially extending shaft 82 which is rotatable with the input shaft 58 in both directions since its rearward end is splined to mate with the internal splines of the inner drive member 60. The flyball type linkage 78 is of the type commonly used as a governor and comprises two oppositely disposed units each including a relatively long arm 84 attached at one end to the outer drive hub 62 and a relatively short arm 86 attached at one end to the rotatable and longitudinally slidable sleeve 80 and at the other end pivotally attached to the long arm 84 at a point intermediate the ends thereof. The long arm portion 84 is so designed that its center of mass is positioned between its free end and the connection with the relatively short arm 86. This may be accomplished in any convenient manner as by providing inserts adjacent the free end of a material having a high density or by machining down or providing a plurality of bores in the longer arm 84 between its connected end and its connection to the shorter arm 86.

The sleeve 0 is operably attached to an elongated tubular indexing member 88 in such a manner that the sleeve 80 will impart its axial movement thereto but will rotate relative thereto. Such a connection may be conveniently accomplished by providing a circumferentially extending groove 90 on the outer surface of the rearward portion of the indexing member 88 and insert a series of pin members 91 through the sleeve with a portion of the body of the pin members 91 positioned in the groove 90.

The indexing member 88 is provided adjacent its forward end with a generally circumferentially extending cam groove 92, a layout of which is shown in FIGURE 10. The groove 92 extends about the external surface of the indexing member 88 and includes a series of axially extending portions 94 spaced 60° apart which are interconnected by transversely extending portions 96. As can be seen in FIGURES 11 and 12, each of the axially extending portions 94 of the groove 92 tapers to its shallowest depth from front to rear, while each of the transverse cam portions 96 tapers from its greatest depth from rear to front. Also, as can be seen in FIGURE 10, the deepest portion 98 of the transverse portion 96 overlaps the axially extending portion 94 at the rearward portion while the deepest part 100 of the axially extending portion 94 overlaps the transverse portion 96 at the forward portion.

By virtue of this arrangement, when the cam follower 102 is at the rear of an axially extending portion 94, it extends into the deepest portion 98 of the transverse portion 96. When the indexing member 88 moves rearward the cam follower is required to ride in the transverse portion 96 until it reaches the forward end thereof and is positioned at the forwardmost portion of the next axially extending portion 94. At this point it drops into the deepest portion 100 of the axially extending portion 94 whereupon when the indexing member moves forward, the cam follower 102 will ride in the axially extending portion 94 of the cam groove 92. Thus, it can be seen that the cam groove 92 is configured in such a manner that the cam follower 102 can rotate about the indexing member 88 in only one direction as the indexing member 88 is reciprocated axially in the tool.

The cam follower 102 is mounted in a rotatable frame member 104 and spring biased into the cam groove 92 by a suitable spring 106. The frame member 104 and cam follower 102 constitute a part of the firing mechanism 108 which also includes a firing pin 110 threadedly attached to the forward end of a striker mechanism 112. The striker mechanism 112 is mounted for axial and rotational movement on a rod member 114 which is attached to shaft 82 for rotation therewith.

An elongated cylindrical bore 116 is machined in the striker mechanism 112 in axial alignment with the firing pin 110 to receive a rod-like guide member 118 which is attached to the rearward end portion of the frame member 104. A striker spring 120 extends between the base of the elongated bore 116 and the rearward portion of the frame member 104 to urge the striker mechanism 112 forwardly in the tool. The forward end portion of the frame member 104 is provided with an opening 122 in axial alignment with the firing pin 110. A firing pin spring member 124 extending between a shoulder 126 in the opening 122 and a flange 128 on the firing pin 110 urges the striker mechanism 112 rearward in the tool.

A pawl member 130 is mounted on the striker mechanism 112 diametrically opposite the firing pin 110 and extends perpendicularly to the axis of the rod member 114. The rod member 114 is provided with a set of helical threads 132 which are positioned rearwardly of the pawl member 130 when the tool is in the neutral position as shown in FIGURE 1. The depth of the groove 134 between the helical thread decreases from front to rear until the helical groove becomes substantially flush with the external diameter of the rod as indicated at 136. The pawl member 130 has an upper end portion 138 adapted to extend into the helical groove 134.

An axially extending pawl detent member 140 is spring biased forward into one of two spaced notches 142 and 144 in the side of the pawl member. As shown in FIGURE 1, when the upper end of the pawl member 138 extends into the helical groove 134, the pawl detent member 140 is in engagement with the notch 142 farthest away from the rod member 114. When the tool is cocked, in a manner to be explained in detail below, the detent member 140 is positioned in the notch 144 closest to the axis of rod member 114 to hold the pawl members 130 out of engagement with the helical thread 132 defining the helical groove 134.

A cam surface 146 is provided in the frame member 104 immediately outwardly of the pawl member 130 and includes a tapering surface 148 adapted to be contacted by a pin member 150 passing through the head of the pawl when the striker mechanism 112 is in its forwardmost position and move the pawl member 130 inwardly so that the upper end 138 thereof will again be positioned within the helical groove 134 and the pawl detent member 140 can engage the notch 142 to hold the pawl member 130 in place.

The breech closure 6 of the housing 2 is provided with frusto-conical openings 152 in axial alignment with each barrel member 14 so that the firing pin 110 can engage the primer positioned at the end portion of the barrel member when the striker mechanism 112 is actuated.

Indicator means 154 shown in FIGURES 14 and 15 may be mounted in the tool to provide an indication to the operator that the indexing function has been completed and the rotation input shaft 58 can be stopped or reversed if desired for firing. The indicator means 154 may comprise an axially extending indicator groove 156 in the indexing member 88 which tapers to its greater depth from front to rear. An indicator member 158 may be mounted in the housing 2 and include a follower portion 160 extending into the indicator groove 156 and spring member 162 biasing the indicator member inwardly.

When the indexing member is in its forward position as shown in FIGURE 1, the outermost surface of the indicator means 154 is substantially flush with the outer surface of the housing 2. When the indexing member 88 moves rearwardly, the indicator member 158 is moved outwardly because of the taper of the indicator groove 156. The indicator member 88 may be provided with visual indicia to indicate when it reaches its outermost position, or may be used to operate an indicating switch to operate a visual or other signal which can be viewed by the operator wherever he is stationed.

As the tool is especially adapted to be used underwater at great depths where the water pressure is great, the sealing of the tool to prevent the entrance of water into the interior of the housing would be a substantial problem. The above-described structural arrangement of the tool of the present invention is adapted to permit all parts of the tool, except for the sealed barrels, to function in a water environment thereby eliminating the need for any sealing. As shown in FIGURE 1, special provision has been made to permit water to enter the interior of the housing. The wall of the housing 2 has at least two openings 164 and 166, one 164 being in the area of the firing mechanism 108 and the other 166 in the area of the flyball linkage 78. Each of the openings 164 and 166 are covered by a strainer 168 to prevent the entrance of dirt and debris. In addition, as shown in FIGURE 9, the arms of the flyball type linkage 78 are elliptical in cross section with the major axis X being tilted slightly from a point where a line Y passing through the axis of the shaft 82 and the midpoint of the arm would be perpendicular to the axis X. Line Z indicates an imaginary line perpendicular to axis X. Thus, the arms 84 and 86 have a pitch which enables them to cut through the water with greater ease as they rotate with the outer drive hub 62 and which also provides added lift to help their outward movement.

In the position shown in FIGURE 1, the firing mechanism 108 is in its neutral position. In such position, the upper end 138 of the pawl member 130 is immediately forward of the beginning of the helical thread 132. The thread 132 is of the type such that if the rod member 114 is rotated in a counterclockwise direction, i.e. the indexing direction, as viewed in FIGURE 13, there will be no effect upon the movement of the striker mechanism 112 since the tip of the pawl member will not be able to engage the groove 134 as it will keep engaging the rearwardmost helical thread portion. However, if the rod member 114 is rotated clockwise, the upper end 138 of the pawl member 130 will ride in the groove 134 between the helical thread 132 whereby the striker mechanism 112 will move rearwardly in the tool.

Moreover in the neutral position of the tool, the striker spring 120 is substantially uncompressed while the firing pin spring 124 urges the striker mechanism 112 slightly rearwardly in the tool.

In operation, after new barrels 14 have been inserted in the proper position in the tool, the male input shaft 58 may be rotated in a counterclockwise direction, as shown in FIGURES 7 and 8. This may be accomplished in any convenient manner such as connecting the input shaft 58 to a reversible motor so constructed that it can be stopped and reversed by switch means. The motor may be mounted in any convenient location depending upon the particular application of the tool and design requirements.

As the input shaft 58 rotates counterclockwise, because of the one-way clutch arrangement provided by the previously described ratchet mechanisms 64 and 66 associated with the inner and outer drive hubs 60 and 62, the outer drive hub 62 will rotate. This rotation causes the arms 84 and 86 of the flyball type linkage to move outwardly because of centrifugal force and also the force of the water on the arms 84 and 86 as they move through the water which causes them to lift due to their pitch. The outward movement of arms 84 and 86 pulls the sleeve 80 rearwardly in the tool along shaft 82. Because of the connection between the sleeve 80 and the indexing member 88, the indexing member 88 will also move rearwardly in the tool. In so doing the cam follower 102, which was originally at the rearward position on one of the axial portions 94 of the cam groove 92, will follow the path of a transverse portion 96 of the groove 92 until it reaches the forwardmost portion of that portion. This action results in the entire firing mechanism 108 rotating 60° into a new position. Once the cam follower 102 is in the forwardmost portion of the next adjacent, axially extending portion 94 of cam groove 92, it will remain there, even though the input shaft 58 continues to rotate.

Once the rotation of the input shaft 58 is stopped, the sleeve 80 and the indexing member 88 will move forward in the tool as the flyball type linkage collapses under the influence of the indexing spring 170. In so doing, the cam follower 102 merely rides in the axially extending portion 94 of the cam groove 92 whereby there is no effect upon the position of the firing mechanism 108.

At this point, to fire the tool the rotation of the input shaft 58 must be reversed. However, as has been explained above, reversal of the input shaft 58 to a clockwise direction will not cause rotation of the drive hub 62 because of the oneway clutch arrangement, and thus there will be no effect upon the indexing member 88. However, as this reverse rotation is continued, the pawl member 130 mounted on the striker mechanism 112 will ride rearwardly in the groove 134 between the helical thread 132 until it reaches the rearward end thereof whereat the depth of the groove 134 decreases to the external diameter of the rod member 114. At this point, the tip 138 of the pawl member 130 is held in its retracted position by virtue of the detent member 140 being positioned in the inner notch 142. Further, since the striker mechanism 112 was moved rearwardly, it compresses the striker spring 120 so that as soon as the tip 138 of the pawl member 130 clears the helical groove 134 in the shaft, the entire striker mechanism 112 is free to move forwardly under the influence of the striker spring 120.

The inertia of the forward motion of the striker mechanism 112 carries it into a forward position wherein the firing pin 110 passes through the frusto-conical opening 152 adjacent the corresponding barrel member 14 to impact upon the primer and ignite the cartridge positioned thereto. At the same time, when the striker mechanism 112 moves forward, the cam surface 146 urges the pawl member 130 inwardly until the upper end portion 138 is in its inward position. The pawl detent member 140 engages the notch 142 to hold the pawl member 130 in this position. As the striker mechanism 112 moves rearward under the influence of the firing pin spring 124 into the neutral position, the tip 138 portion of the pawl member 130 will again engage the forward portion of the helical thread 132. If the input shaft 58 is continuously rotated in this direction, the striker mechanism 112 will again be moved rearwardly and then fly forwardly in the manner just explained, with the firing pin 110 each time striking the same fired barrel in a harmless manner.

To index the firing mechanism 108 to fire a new barrel, it is necessary that after the firing of a given barrel, the direction of rotation of the input shaft 58 must be reversed, whereupon the one-way clutch will drive the outer drive hub 62 and activate the indexing member 88 in the manner heretofore explained.

By virtue of the above-described construction, an efficient underwater fastening tool is provided. The presence of the particular indexing and firing mechanisms, along with the one-way clutch arrangement, permits the firing means to be indexed to a new barrel and the tool fired by merely reversing the direction of rotation of an input shaft. In addition, the tool is so designed that the barrels can be removed and replaced with new barrels in a quick and easy manner.

While reference has been made above to a specific embodiment of this invention, various modifications and alterations will readily suggest themselves to those skilled in the art. Accordingly, the scope of this invention should be ascertained by reference to the following claims.

What is claimed is:

1. In a fastening tool, a housing, a plurality of barrels circumferentially spaced apart and extending forwardly from said housing, an input shaft, firing means mounted for rotational movement about an axis for alignment with one of said barrels, indexing means responsive to rotation of said input shaft in one direction to rotate said firing means into alignment with the next adjacent barrel, means responsive to rotation of said input shaft in the other direction to cock and fire said firing means.

2. In a fastening tool, a housing, a plurality of barrels extending from said housing and evenly spaced about an imaginary circle means removably attaching said barrels to said housing, rod means mounted in said housing for rotational movement, input shaft means operably connected to said rod, means to impart rotation thereto, firing means mounted for rotation about said rod means, indexing means operable upon rotation of said input shaft in one direction to rotate said firing means about said shaft into alignment with the next succeeding barrel, and means for cocking and firing said firing means in response to rotation of said input shaft means in said opposite direction.

3. The fastening tool of claim 2 wherein said firing means includes a frame member mounted for rotation about said rod means, a firing pin mounted on holder means operably connected to said frame member for rotation therewith and relative axial movement, spring means biasing said holder means toward said barrel member, and said means for cocking and firing comprises means on said rod means to cock and fire said firing pin, means on said holder means to engage said means on said shaft for moving said holder means upon rotation of said rod means in said opposite direction into a cocked position and then releasing said holder means so said firing pin can be propelled toward said barrel under the influence of said spring means to fire said tool.

4. The fastening tool of claim 3 wherein said means on said shaft includes a helical thread defining a helical groove which tapers outwardly at its end farthest from said barrels to a point flush with the outer diameter of said shaft, said means on said holder means includes a pawl member mounted in said holder means and spring biased into engagement with the bottom of said helical groove, and a detent member adapted to engage said pawl member for holding said pawl member either in a first position wherein it engages the bottom of said groove or a second position wherein it is positioned out of said groove, cam surface engaging means on said pawl member, and cam surface means on said holder means to move said pawl member from said second position to said first position when said holder means moves forwardly to fire said tool.

5. The fastening tool of claim 2 wherein said indexing means includes an indexing member mounted on said rod means for reciprocal movement between a forward position and a rearward position, a second member operably attached to said sleeve for reciprocation therewith and relative rotation therewith, a third member mounted for rotation in said tool, one-way clutch means between said input shaft and said third member for rotating said third member upon rotation of said input shaft in one direction and preventing rotation of said third member in the other direction, means interposed between said second and third members for moving said second member and said indexing member from a first position to a second position closer to said first member upon rotation of said third member, means biasing said second member toward said first position, and cooperating means on said indexing member and said firing means for indexing said firing means to alignment with the next adjacent barrel upon movement of said indexing member from its first to second position and back to said first position.

6. The firearm of claim 5 wherein said firing means includes a frame member for rotation about said rod means, a firing pin mounted on holder means operably connected to said frame member for rotation therewith and relative axial movement, and said cooperating means includes a cam groove extending circumferentially about said indexing member, and a cam follower mounted on said frame member, said cam groove comprising a series of axially extending portions interconnected by transversely extending portions.

7. The fastening tool of claim 6 wherein each of the axially extending portions of said cam groove tapers such that its deepest point is closest to said barrels, each of said transversely extending portions tapers such that the deepest point is farthest away from said barrels, said cam follower is positioned such that it is in the cam groove at a point farthest away from said barrels when said indexing mechanism is in its forward position, and said cam follower is biased toward said indexing member.

8. The fastening tool of claim 5 wherein said means interposed between said second and third members comprises a flyball type linkage.

9. The fastening tool of claim 8 wherein said flyball type linkage comprises a pair of oppositely disposed linkages, each linkage including a relatively long arm attached to said third member and a relatively short arm attached at one end to said second member and at the other end to said first arm at a pivot point intermediate the ends of said first arm, the center of mass of said first arm position between its free end and the pivot point.

10. The fastening tool of claim 9 wherein all of said arm have an elliptical cross section and are pitched so that the axis of elongation of the ellipse is almost perpendicular to an immaginary line passing through the axis of said rod means.

11. The fastening tool of claim 5 wherein said one-way clutch means comprises a female member having a bore with splines thereon, said input shaft having mating splines being positioned within said bore, a pawl and ratchet mechanism between said female member and said third member engageable upon rotation of said female member in one direction to rotate said third member, and a second pawl and ratchet mechanism positioned between said third member and said housing for preventing rotation of said third member upon rotation of said female member in the opposite direction.

12. The fastening tool of claim 6 further including indicator means to tell when said indexing member is in its second position, said indicator means comprising a member mounted in said housing for reciprocal movement in a direction perpendicular to said rod means, said member having a cam follower portion, an indicator cam groove in said indexing member extending axially therealong and tapering to its greatest depth from front to rear, said cam follower being positioned in the deepest part of said indicator cam groove when said indexing member is in its first position.

13. The fastening tool of claim 2 wherein each of said barrels includes a cylindrical body portion and a rearward outwardly extending flange, said means removably mounting said barrels comprises a barrel holder mounted on a rod extending from said housing, said barrel holder comprising a first ring member having a plurality of semicircular cutouts spaced equally about its inner edge portion, a rearward disc member spaced from said ring member and including a plurality of cutouts in its outer edge, each of said cutouts including a bottom semi-circular portion, the axis of the semi-circular portion of a cutout in said disc member being concentric with the axis of one semi-circular cutout in said ring member, means interconnecting said ring member and said disc member, a cylindrical extension on said housing, a plurality of semicircular cutouts in said extension, the bottom portion of each of said cutouts being semi-circular with its axis being aligned with one of said semi-circular cutouts in said disc member, and means covering the cutouts in said extension, each of said barrel members being mounted in the series of concentric cutouts in said ring member, disc member, and cylindrical member.

14. The fastening tool of claim 13 wherein said means covering said cutouts includes a barrel retaining member extending about said housing, the portion of said ring member cobering the cutouts in said extension having a radially extending slot of a width substantially equal to the diameter of said cutouts, a circumferential groove extending about said housing, and a plurality of screw members extending through said barrel retaining member into said groove.

15. In a fastening tool, a housing; a plurality of barrels extending from said housing and evenly spaced about an imaginary circle; means removably attaching said barrels to said housing; rod means mounted in said housing for rotational movement; input shaft means operably connected to said rod means to impart rotation thereto; firing means mounted for rotation about said rod means; indexing means operable upon rotation of said input shaft in one direction to rotate said firing means about said shaft into alignment with the next succeeding barrel; and means for cocking and firing said firing means in response to rotation of said input shaft means in said opposite direction; said firing means including a frame member mounted for rotation about said rod means, a firing pin mounted on holder means operably connected to said frame member for rotation therewith and relative axial movement, spring means biasing said holder means toward said barrel member; said means for cocking and firing comprising means on said rod means to cock and fire said firing pin, means on said holder means to engage said means on said shaft for moving said holder means upon rotation of said rod means in said opposite direction into a cocked position and then releasing said holder means so said firing pin can be propelled toward said barrel under the influence of said spring means to fire said tool; and said indexing means including an indexing member mounted on said rod means for reciprocal movement between a forward position and a rearward position, a second member operably attached to said sleeve for reciprocation therewith and relative rotation therewith, a third member mounted for rotation in said tool, one-way clutch means between said input shaft and said third member for rotating said third member upon rotation of said input shaft in one direction and preventing rotation of said third member in the other direction, means interposed between said second and third members for moving said second member and said indexing member from a first position to a second position closer to said first member upon rotation of said third member, means biasing said second member toward said first position, and cooperating means on said indexing member and said firing means for indexing said firing means to alignment with the next adjacent barrel upon movement of said indexing member from its first to second position and back to said first position, said cooperating means including a cam groove extending circumferentially about said indexing member and a cam follower mounted on said frame member, said cam groove comprising a series of axially extending portions interconnected by transversely extending portions.

References Cited

UNITED STATES PATENTS

| | | | |
|---|---|---|---|
| 2,930,041 | 3/1960 | Massacrier | 227—11 |
| 3,048,850 | 8/1962 | Schilling | 227—11 |

GRANVILLE Y. CUSTER, Jr., Primary Examiner